June 24, 1930.                J. F. WALLACE                1,767,105
SHOCK ABSORBING STRUT
Filed Dec. 9, 1927
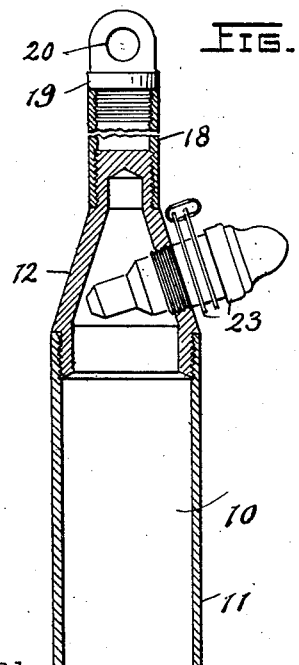
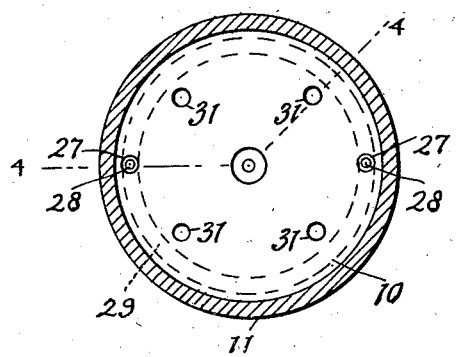
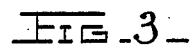
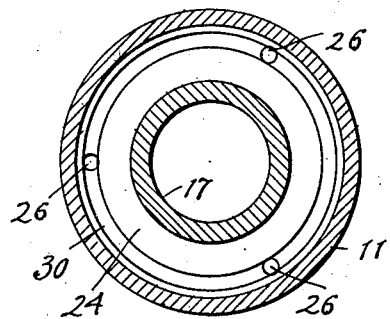
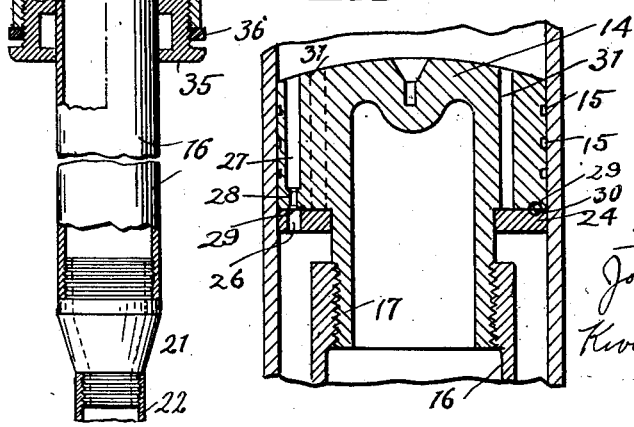

Patented June 24, 1930

1,767,105

UNITED STATES PATENT OFFICE

JOHN F. WALLACE, OF SHAKER HEIGHTS, OHIO, ASSIGNOR TO THE CLEVELAND PNEUMATIC TOOL COMPANY, OF CLEVELAND, OHIO, A CORPORATION OF OHIO

SHOCK-ABSORBING STRUT

Application filed December 9, 1927. Serial No. 238,838.

This invention relates to improvements in shock-absorbing struts for use primarily in the landing gears of airplanes and hydroplanes.

One of the objects of the invention is the provision of a strut which is of relatively compact, simple construction and which not only takes the impact of landing and other blows delivered to the landing gear as the plane moves over the ground or water but also absorbs the rebound resulting from the compression of the compressible fluid in the strut.

More particularly, it is the aim of the invention to provide a strut composed of telescoping members having on the interior a chamber in which oil or other non-compressible fluid and compressed air are contained, with provision whereby when the impact occurs in landing a very satisfactory cushioning action is obtained, with equally satisfactory provision for preventing sudden rebound. That is to say, the return movement of the telescopic members is retarded so as to be relatively slow as compared with the telescopic movement in the opposite direction.

Another object is the provision in apparatus of this character of a very simple, one-way valve of low cost and great reliability.

Still another object is an arrangement of parts by virtue of which the pressure existing below the piston incident to the rebound stroke is utilized to effect a heavy frictional contact of the packing employed to seal the relatively sliding parts, thereby not only effectively preventing the loss of pressure fluid at a time when such loss is quite liable to occur but also adding to the resistance available to oppose the rebound stroke, and making the action of the device exceptionally smooth.

Other objects and features of novelty will appear as I proceed with the description of that embodiment of the invention which, for the purposes of the present application, I have illustrated in the accompanying drawings, in which:

Fig. 1 is a longitudinal sectional view of a strut embodying the invention;

Fig. 2 is a transverse section taken substantially on the line 2—2, Fig. 1;

Fig. 3 is a transverse section taken substantially on the line 3—3, Fig. 1; and

Fig. 4 is a cross-section taken substantially on the line 4—4, Fig. 2, showing the piston on a larger scale and showing the valve ring in a position different from that illustrated in Fig. 1.

In the drawing, there are illustrated two principal telescoping parts. The upper and outer one may be referred to generally as a cylinder 10, and comprises a tubular member 11 threaded at its upper end to receive a dome-shaped head 12. The lower end of the tubular member 11 is enlarged, as shown at 13, to accommodate the packing which will be described presently.

Within the tubular member 11 there is positioned a metal piston 14 finished to a nice sliding fit and preferably provided with a plurality of circumferential oil grooves 15. A piston rod 16, of a diameter smaller than that of the piston, and preferably tubular in form, is connected to the piston in some suitable manner. To this end, I may form the piston 14 with a shank 17 which is threaded into the threaded upper end of the tubular piston rod 16, thereby connecting the two together rigidly.

Any suitable means may be provided for attaching the cylinder 10 and the piston rod 16 to such relatively movable parts of a vehicle as it may be desired to cushion. These connections will vary considerably with the type of vehicle to which the device may be applied. For use upon airplanes, I may attach to the head 12 by a threaded joint a tubular extension bar 18 and at the free end of the latter I may attach by a threaded joint or the like a connector 19 having a perforation 20 for the reception of an attaching bolt or pin. The lower end of the tubular piston rod 16 may be threaded to receive a reducing connection 21 to which is threaded a tubular extension bar 22 similar to the bar 18, and it will be understood that at the free end of this bar 22 there may be attached any suitable connector, as, for instanace, a duplicate of the connector 19.

The cylinder 10 is to be filled with fluid, preferably oil and air under pressure. Any suitable filling plug and valve may be used, and as its construction forms no part of the present invention, I have shown merely the external outline of such a plug at 23.

A flat metal ring 24 is loosely mounted upon the smooth upper portion of the shank 17 of the piston, this ring being movable within a recess 25 formed between the piston proper and the upper end of the tubular piston rod 16. The ring 24 has ports 26 extending therethrough at equal distances from the center of the ring. At the same radial distance the piston 14 is also provided with one or more passages 27 extending parallel to the axis of the cylinder 10, and these passages, if desired, may have restrictions 28 therein. The lower surface of the piston head, or the upper surface of the ring 24, or both, may be provided with a circular groove in order to insure an uninterrupted flow of fluid through the passages 27 and ports 26 when the valve ring 24 is in its upper position against the head of the piston. In the present instance, I have indicated such a groove at 29 on the under surface of the piston and another such groove at 30 on the upper surface of the ring 24. A second series of passages 31 extend through the piston 14 from its upper surface to the recess 25 but at a shorter radial distance from the center of the piston where they are covered by the upper flat surface of the valve ring 24 when the latter is in its upper position.

An annular shoulder 32 is formed at the juncture between the tubular member 11 and its enlargement 13. An annular retainer 33 is mounted to slide between the surfaces of the piston rod 16 and the enlargement 13, its movement in one direction being limited by the shoulder 32 which thus acts as a stop. Below the retainer 33 and in the annular space between the cylinder enlargement 13 and the piston rod 16 is located packing 34 which is in the form of rings, some of which are made up in such a way that they expand radially when pressure is exerted upon them in a direction parallel to the axis of the cylinder. In the end of the enlargement 13 there is threaded a gland nut 35 which bears upon the lower end of the packing 34. This nut 35 is employed to control the minimum friction exerted upon the walls of the parts 16 and 13 by the packing 34. As this nut is threaded inwardly, the packing 34 is expanded and the friction correspondingly increased. The lock ring 36 is employed to hold the nut 35 in any given adjusted position. The packing 34 is a known commercial article and its detailed make-up forms no part of the present invention.

After the parts are assembled and the strut is mounted, for instance, between the landing gear and the frame of an airplane the filling plug 23 being open and the cylinder and piston in their collapsed position, that is, with the piston up to the head of the cylinder or approximately so, oil is introduced until the head 12 is practically filled. Then an air pressure hose is attached to the filling plug 23 and the strut is inflated until the weight of that side of the airplane is balanced by the air pressure within the strut with the piston in substantially the position shown in Fig. 1. During this inflation the cylinder 10 obviously rises, lifting the airplane. At this time oil fills the annular space 9 between the piston 14 and the packing retainer 33 and stands somewhat above the top of the piston.

Now, when the airplane rises from the ground and the weight is taken off the strut, the pressure in the cylinder 10 expands the strut to the limit, that is, until the piston 14 engages the retainer 33 and presses upon the same with all of the pressure available upon the top surface of the piston. By this means the ring 33 is depressed, expanding the packing 34 considerably. A very tight seal is thus formed between the two telescoping members 10 and 16 when the plane is in the air. Hence, none of the oil which is in the lower end of the strut leaks out, and if the airplane is inverted in flight, as sometimes occurs, so that air under pressure impinges upon the packing, the seal is still tight enough to prevent any appreciable loss of pressure, which is a highly important result in devices of this character.

When a landing is made, the landing gear strikes the found with considerable force. This force causes the piston 14 to move rapidly upward in the cylinder 10 against the compressed air therein contained. At the beginning of this stroke, the oil in the strut is practically all above the piston. However, the ring 24 is in its lower position, as shown in Fig. 1, and a minimum resistance is offered to the flow of oil through passages 31 and 27 into the recess 25 and thence through ports 26 into the annular spaces below the piston.

As soon as the piston moves away from the retainer 33 and advances rapidly into the cylinder 10, thereby greatly reducing the area through which the pressure in the cylinder 10 may act upon the retainer 33, and thereby creating a light vacuum in the annular space below the piston head, pressure upon the retainer 33 is greatly relieved and it moves upwardly into engagement with the shoulder 32, thereby subjecting the sliding parts to the minimum of friction from the packing 34.

When the force of the impact is balanced by the pressure built up above the piston, the latter stops and the energy thus stored up in the highly compressed air in the cylinder tends to drive the piston downwardly with a violent motion. The piston head immediately catches up with the loose valve ring 24, as indicated in Fig. 4, and the latter is held in its upper position by the pressure of the oil beneath. Consequently, the passages 31 are closed and the oil can flow upwardly past the piston only so fast as it can be metered through the restrictions 28 in the passages 27. The rebound is thus slowed up. At the same time, however, the oil in the annular space 9 transmits the heavy pressure above the piston down upon the retainer 33, forcing the same downwardly and expanding the packing 34. By this means heavy friction between the sliding parts is added to contribute to the slowing up of the rebound stroke.

While, as previously stated, this invention is intended primarily for use in airplanes and hydroplanes, I do not desire to restrict the invention in this respect, as it is capable of application to other vehicles, as for instance automobiles.

Having thus described my invention, I claim:

1. In a shock-absorbing strut, a cylinder, a member telescoping therewith, a piston on the inner end of said member in sliding engagement with the cylinder, expansible packing between said cylinder and telescoping member exposed to the pressure of the fluid surrounding said member behind said piston, and means for permitting the flow of fluid from one side of the piston to the other more freely in one direction than in the other, whereby the fluid between said piston and said packing serves not only as a rebound check but also as means for regulating the friction between said packing and the adjacent parts.

2. In a shock-absorbing strut, a cylinder, a member telescoping therewith, a piston on the inner end of said member in sliding engagement with the cylinder, expansible packing between said cylinder and telescoping member exposed to the pressure of the fluid surrounding said member behind said piston, and means for permitting the flow of fluid from one side of the piston to the other comprising a one-way valve, whereby the fluid between said piston and said packing serves not only as a rebound check but also as means for regulating the friction between said packing and the adjacent parts.

3. In a shock-absorbing strut, a cylinder, a member telescoping therewith, a piston on the inner end of said member in sliding engagement with the cylinder, expansible packing between said cylinder and telescoping member exposed to the pressure of the fluid surrounding said member behind said piston, said piston having a passage therethrough connecting the space between the piston and cylinder head with the space below the piston outside said telescoping member, and a valve carried by said piston adapted to close said passage as the piston and cylinder move relatively outwardly, whereby the fluid between said piston and said packing serves not only as a rebound check but also as means for regulating the friction between said packing and the adjacent parts.

4. In a shock-absorbing strut, a cylinder adapted to hold fluid under pressure, a piston therefor comprising a head provided with a passage extending therethrough, said piston having an annular peripheral recess intersecting said passage, and a ring mounted loosely in said recess and adapted to move therein longitudinally of the piston as the direction of movement thereof changes, said ring being adapted to cover said passage in one position and open it in the other.

5. In a shock-absorbing strut, a cylinder adapted to hold fluid under pressure, a piston therefor, said cylinder providing chambers upon both sides of said piston when the latter is in an intermediate position, said piston having a passage therethrough connecting said chambers, said piston also having an annular peripheral recess intersecting said passage, and a ring loosely mounted in said recess constituting a valve for opening and closing said passage as the piston moves in one direction or the other, whereby movement of the piston is restricted in one direction more than in the other.

6. In a shock-absorbing strut, a cylinder adapted to hold fluid under pressure, a piston therefor, said cylinder providing chambers upon both sides of said piston when the latter is in an intermediate position, said piston having a passage therethrough, said piston also having an annular recess intersecting said passage, and a ring loosely mounted in said recess provided with a port therethrough at a distance from the center radially equal to that of said passage, there being an annular groove in one of the adjacent surfaces of said piston and ring, whereby the flow of fluid through said passage and port is not affected by their relative angular relation, said piston having a second passage therethrough intersecting said annular recess at a point out of line with said annular groove.

In testimony whereof, I hereunto affix my signature.

JOHN F. WALLACE.